A. M. OLDS.
Ash Sifting Shovel.
No. 49,781. Patented Sept. 5, 1865.
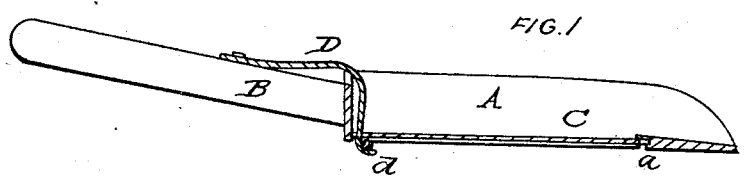
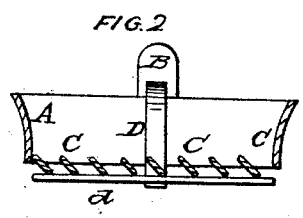
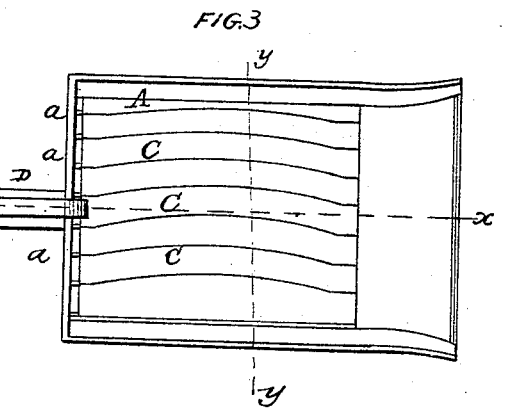
WITNESSES
M. M. Livingston
C. L. Topliff
INVENTOR
A. M. Olds

UNITED STATES PATENT OFFICE.

A. M. OLDS, OF CHICAGO, ILLINOIS.

ASH-SIFTING SHOVEL.

Specification forming part of Letters Patent No. 49,781, dated September 5, 1865; antedated August 25, 1865.

*To all whom it may concern:*

Be it known that I, A. M. OLDS, of Chicago, in the county of Cook and State of Illinois, have invented a new and Improved Ash-Sifting Shovel; and I do hereby declare that the following is a full, clear, and exact description thereof, which will enable others skilled in the art to make and use the same, reference being had to the accompanying drawings, forming part of this specification, in which—

Figure 1 is a longitudinal vertical section of this invention, taken in the plane indicated by the line $x\,x$, Fig. 3. Fig. 2 is a transverse vertical section of the same, the line $y\,y$, Fig. 3, ndicating the plane of section. Fig. 3 is a plan or top view of the same.

Similar letters of reference indicate like parts.

This invention consists in a shovel provided with one or more movable slats in such a manner that when the slats are closed the bottom of the shovel acts like a solid bottom, but if the slats are opened it acts like a sieve and serves to separate ashes from the coal. The slats are made curved, and the tenons on which they swing are placed somewhat in advance of their front edges, so that they will open easily as soon as the bar or other device supporting them is removed, and that they are not liable to remain closed if a large lump of coal or other heavy article lodges on them. A spring-catch serves to hold the slats closed, and by pressing on said catch the slats are allowed to open simultaneously by their own gravity. This spring-catch is secured to the handle of the shovel, so that it can be readily operated by the hand which holds said shovel.

A represents a shovel, made of cast-iron or any other suitable material, and provided with a handle, B, as clearly shown in the drawings. The handle is either cast solid with the shovel, or it may be connected therewith in any other desirable manner. The bottom of the shovel is formed of one or more slats, C, which are hung on pivots $a$, dropping in suitable sockets in the end strips of the shovel, as clearly shown in Fig. 1, and said slats are so arranged that they will open by their own gravity if they are not supported. When they are closed they form a solid bottom; but if they are open they serve as a sieve.

In order to be able to introduce the slats easily, I propose to cast in the strip or end piece next the handle a series of cavities or recesses equal in width to the thickness of the slats and in a vertical direction, so that if the slats are brought in a vertical position they can be moved sufficiently far toward the handle to allow of entering the tenons on the opposite ends in their sockets; but if the slats are in an inclined position they are not permitted to drop out, and since they are not allowed to come in a vertical position after they are once introduced, they will be securely held in their positions.

The edges of the slats are curved back so that the tenons are situated in front of the same, and the center of gravity of each slat is thereby thrown back as far as possible. By this arrangement the slats are caused to open with more ease than they would if the centers of gravity should be placed close to the longitudinal lines drawn through the tenons. Furthermore, by curving the edges of the slats the ashes and coal are caused to move toward the center of the bottom as soon as the slats are opened, and the separation of the same is facilitated.

The slats are held closed by a spring-catch, D, which carries a rod, $d$, bearing on the under surfaces or edges of the slats, as shown in Figs. 1 and 2 of the drawings. This spring-catch is secured to the handle B, so that it can be readily operated by the hand which holds the handle.

The shovel can be made cheap, and it is of great convenience. It serves the double purpose of an ordinary shovel and of an ash-sifter.

I claim as new and desire to secure by Letters Patent—

1. Constructing the bottom of a shovel of one or more movable slats pivoted to the frame, substantially as and for the purpose set forth.

2. Placing the tenons on which said slats swing in front of their edges, substantially as and for the purpose described.

3. Curving the edges of the slats, substantially as and for the purpose specified.

4. The arrangement of the spring-catch D, in combination with the movable slats C and shovel A, constructed and operating substantially as and for the purpose set forth.

A. M. OLDS.

Witnesses:
M. M. LIVINGSTON,
C. L. TOPLIFF.